United States Patent

Berthereau

[11] Patent Number: 6,133,179
[45] Date of Patent: Oct. 17, 2000

[54] GLASS COMPOSITIONS OF THE SILICA-SODA-LIME TYPE

[75] Inventor: Anne Berthereau, Paris, France

[73] Assignee: Saint Gobain Vitrage, Courbevoie, France

[21] Appl. No.: 09/247,329

[22] Filed: Feb. 10, 1999

[30] Foreign Application Priority Data

Feb. 11, 1998 [FR] France ................................. 98 01592

[51] Int. Cl.⁷ .......................... C03C 3/087; C03C 3/095
[52] U.S. Cl. .................................. 501/70; 501/71; 501/64
[58] Field of Search .................. 501/70, 71, 64

[56] References Cited

U.S. PATENT DOCUMENTS

| | | | |
|---|---|---|---|
| 2,776,217 | 1/1957 | Gott | 501/70 |
| 4,015,966 | 4/1977 | Weaver . | |
| 4,461,839 | 7/1984 | Rittler et al. | 501/70 |
| 5,478,783 | 12/1995 | Higby et al. . | |
| 5,830,814 | 11/1998 | Combes . | |
| 5,858,896 | 1/1999 | Nagashima et al. | 501/70 |

FOREIGN PATENT DOCUMENTS

WO 94/14716   7/1994   WIPO .

*Primary Examiner*—Mark L. Bell
*Assistant Examiner*—David Sample
*Attorney, Agent, or Firm*—Pennie & Edmonds LLP

[57] ABSTRACT

The subject of the invention is a glass composition of the silica-soda-lime type, having a UV transmission such that $T_{UV.ISO}<15\%$, and preferably $T_{UV.ISO}\leq 13\%$, for a glass thickness of between 2.85 mm and 4.85 mm, and containing the oxides below, within the following weight limits:

$Fe_2O_3$   0.4–1.5%
$WO_3$   0.1–1.2%.

20 Claims, No Drawings

GLASS COMPOSITIONS OF THE SILICA-SODA-LIME TYPE

BACKGROUND OF THE INVENTION

The invention relates to novel glass compositions of the silica-soda-lime type which are intended for the production of flat glass, bottles or flasks. Although the invention is not limited to such an application, it will be described more particularly with reference to motor-vehicle applications.

Windows intended for the motor-vehicle industry are subject to various requirements, especially with regard to their optical properties; these requirements are governed by regulations, for example those regarding the light transmission of a windscreen or those concerned with the user's comfort, for example with regard to energy transmission, or else those concerned with the aesthetic appearance, especially with regard to colour.

Moreover, manufacturers have for some time been focusing on a new requirement—that regarding UV transmission. The purpose of this new tendency is in particular a wish for the best possible protection of the skin from sunlight, which avoids suntanning and sunstroke. Another purpose of this tendency is to reduce fading of fabrics with which the interior of motor vehicles are furnished.

It is known that iron, in its ferric ion form $Fe^{3+}$, i.e. in the $Fe_2O_3$ form, makes it possible to absorb in the ultraviolet. Moreover, it is known that iron, in its ferrous ion form $Fe^{2+}$, i.e. in the FeO form, makes it possible to absorb in the infrared and therefore to absorb energy.

It is thus known that controlling the redox (oxidation-reduction coefficient) of a glass composition makes it possible to regulate the absorption in the ultraviolet compared with that in the infrared with regard to the action of iron.

Moreover, it has already been described, especially in Patent Application WO 94/14716, that cerium oxide $CeO_2$ has an effect on the UV absorption. However, introducing this oxide increases the cost of the composition very significantly because of the cost of the batch materials which allow this oxide to be introduced.

It has already also been described, especially in Patent U.S. Pat. No. 5,478,783, that titanium oxide $TiO_2$ also has an effect on the UV absorption. Although the cost of introducing $TiO_2$ into a glass matrix is less than that of $CeO_2$, it nevertheless remains very high.

It is also known, especially from document WO 94/14716, to combine the two oxides $CeO_2$ and $TiO_2$, still for the purpose of achieving better UV absorption. Of course, such a combination does not allow the additional cost of introducing these oxides into a glass matrix to be reduced.

SUMMARY OF THE INVENTION

The inventors were thus given the task of designing glass compositions of the silica-soda-lime type which possess enhanced UV absorption having an additional production cost of less than that involved in the abovementioned techniques.

This objective was achieved according to the invention by a glass composition of the silica-soda-lime type having a UV transmission such that $T_{UV,ISO}$ is less than 15%, and preferably less than 13%, for a glass thickness of between 2.85 mm and 4.85 mm, especially one equal to 3.85 mm, and containing the oxides below, within the following weight limits:

$Fe_2O_3$  0.4–1.5%
$WO_3$  0.1–1.2% where $Fe_2O_3$ is the total iron.

The $Fe_2O_3$ oxide content is advantageously such that:

$$0.8\% \leq Fe_2O_3 \leq 1.3\%$$

Preferably, the glass composition has a $T_{UV,ISO}$ of less than 10% for a glass thickness of between 2.85 mm and 4.85 mm, and preferably of between 3 and 4 mm.

It seems in fact that the simultaneous presence of the two oxides, $Fe_2O_3$ and $WO_3$, leads to an improvement in the UV absorption of glass compositions of the silica-soda-lime type. The results obtained with regard to UV transmission are quite comparable with those obtained using the techniques involving the oxide $TiO_2$. However, the cost of producing the composition according to the invention id markedly less than that of the prior techniques, especially because of the cost of the batch materials.

Batch materials containing $WO_3$ may be of various kinds; they may, for example, be pure $WO_3$ or yellow or blue wolfram which contains 98.5% $WO_3$. In order to reduce the production cost even more, batch materials containing $WO_3$ day be ores, such as scheelite, consisting mainly of $CaWO_4$, or wolframite, consisting mainly of $Fe\ Mn(WO_3)$.

DETAILED DESCRIPTION OF THE INVENTION

According to a preferred embodiment of the invention, the overall energy transmission $T_E$ is less than 50%, and preferably less than 45%, for a thickness of 3.85 mm. Such requirements correspond especially to those for motor-vehicle applications that are required to ensure the comfort of the individuals in the passenger compartment. More preferably still, the redox, i.e. the $FeO/Fe_2O_3$ ratio, is between 0.12 and 0.29 and preferably between 0.15 and 0.26.

According to a first embodiment, and more particularly for motor-vehicle applications such as windscreens or rear windows, the overall light transmission factor under illuminant A ($T_{LA}$) is greater than or equal to 70%.

According to another embodiment of the invention, and more particularly for motor-vehicle applications such as side windows, the overall light transmission factor under illuminant A ($T_{LA}$) is less than or equal to 35%.

According to a third variant of the invention, and more particularly for applications such as motor-vehicle sunroofs, the overall, light transmission factor under illuminant A ($T_{LA}$) is less than or equal to 10%. According to an alternative embodiment, the $Fe_2O_3$ content is advantageously greater than 1.5%.

According to a preferred embodiment of the invention, the glass composition comprises the constituents below, within the following weight limits:

| | |
|---|---|
| $SiO_2$ | 68.5–74% |
| CaO | 7–10% |
| MgO | 0–5% |
| $Al_2O_3$ | 0–1.5% |
| $K_2O$ | 0–1% |
| $Na_2O$ | 13–16%. |

More preferably still, the glass composition comprises the constituents below within the following weight limits:

| | |
|---|---|
| $SiO_2$ | 70–73% |
| CaO | 8–10% |
| MgO | 0–4% |
| $Al_2O_3$ | 0–1% |
| $K_2O$ | 0–1% |
| $Na_2O$ | 13–16%. |

The silica is maintained within the relatively narrow limits for the following reasons: above approximately 74%, the viscosity of the glass and its ability to devitrify greatly increase, making it much more difficult to melt and to cast onto a bath of tin; below 68.5%, the hydrolytic resistance of the glass decreases very rapidly and the transmission in the visible also decreases.

This reduction in the hydrolytic resistance of the glass may be at least partly compensated for by the introduction of $Al_2O_3$, but this oxide helps to increase its viscosity and to reduce the transmission in the visible; it can therefore be used only in a very small amount.

The alkali metal oxides $Na_2O$ and $K_2O$ make it possible for the glass to melt easily and for its high-temperature viscosity to be adjusted. $K_2O$ is advantageously used with contents of less than 1%; the $K_2O$ concentration can be increased, but mainly only to the detriment of $Na_2O$, this possibly contributing to an increase in the viscosity. The sum of the $Na_2O$ and $K_2O$ weight contents is preferably greater than 15%.

The alkaline-earth metal oxides introduced into the glasses according to the invention have the overall effect of raising the high-temperature viscosity. The CaO content must not exceed 10% in order to keep the devitrification of the glasses within acceptable limits.

With regard to the oxide MgO, according to a first embodiment of the invention, its content is advantageously greater than 2%, especially from an economic standpoint.

According to another embodiment, its content is less than 2%; it has been shown that such MgO contents characterize the composition according to the invention by a shift in the maximum of the FeO absorption band to long wavelengths. Limiting the MgO concentration in the glasses of the invention to 2%, and preferably eliminating it therefrom, by intentional addition, make it possible actually to increase their ability to absorb in the infrared. Complete elimination of MgO, which has a major effect on the viscosity, may be at least partly compensated for by increasing the $Na_2O$ and/or $SiO_2$ content.

BaO, which makes it possible to increase the light transmission, may be added to the compositions according to the invention in contents of less than 4%. This is because BaO has a much smaller influence on the viscosity of the glass than MgO and CaO. Within the context of the invention, increasing the BaO content is mainly to the detriment of the alkali metal oxides, MgO and especially CaO. Any significant increase in BaO therefore helps to increase the viscosity of the glass, especially at low temperatures. In addition, introducing a high concentration of BaO substantially increases the cost of the composition and has a tendency to reduce the hydrolytic resistance of the glass. When the glasses of the invention contain barium oxide, the concentration of this oxide is preferably between 0.5 and 3.5% by weight.

Apart from meeting the limits defined above with regard to the variation in the content of each alkaline-earth metal oxide, it is preferable to limit the sum of the MgO, CaO and BaO concentrations to a value of less than or equal to 12% in order to obtain the desired transmission properties.

With regard to the oxide $WO_3$, a relatively high content may be accompanied by a yellowish coloration of the glass.

According to one embodiment of the invention, the glass composition furthermore comprises the oxide $CeO_2$ with a weight content of less than or equal to 2.2%, and preferably less than 1.6%. More preferably still, the glass composition comprises the oxide $CeO_2$, within the following weight limits:

$$0.2 \leq CeO_2 \leq 1.5\%.$$

This oxide actually makes it possible, in combination with $WO_3$, to obtain the required properties and to avoid yellowish coloration when the $WO_3$ contents are relatively high. Advantageously, it is thus possible to obtain a $T_{UV.ISO} \leq 10\%$.

According to another embodiment of the invention, the glass composition comprises the oxide $TiO_2$ with a weight content of less than or equal to 1% and preferably greater than 0.1%. The oxide $TiO_2$ may be present in combination with the oxide $CeO_2$.

Likewise, in another embodiment, the glass composition comprises the oxide $La_2O_3$ with a weight content of less than or equal to 2%, it being possible for this to be present in combination with the oxides $CeO_2$ and/or $TiO_2$. Advantageously, when lanthanum oxide $La_2O_3$ is used, it is provided by the batch materials containing the oxide $CeO_2$.

When it is desired to produce coloured glasses, the glass compositions may furthermore comprise one or more colouring agents such as CoO, Se, $Cr_2O_3$, NiO, $V_2O_5$.

The glasses according to the invention may also contain up to 1% of other constituents which are provided by the impurities in the batch materials and/or because of the introduction of cullet into the batch mixture and/or which come from the use of a refining agent ($SO_3$, Cl, $Sb_2O_3$, $As_2O_3$).

To facilitate the melting operation, and especially to make it mechanically beneficial, the matrix advantageously has a temperature, corresponding to a viscosity $\eta$ such that $\log\eta = 2$, of less than 1500° C. More preferably still, and especially for producing the substrate from a ribbon of glass obtained using the float technique, the matrix has a temperature $T_{log\eta=3.5}$ corresponding to a viscosity $\eta$, expressed in poise, such that $\log\eta = 3.5$ and a liquidus temperature $T_{liq}$ which satisfy the relationship:

$$T_{log\eta=3.5} - T_{liq} > 20° C.$$

and preferably the relationship:

$$T_{log\eta=3.5} - T_{liq} > 50° C.$$

Further details and advantageous characteristics will emerge below from the description of illustrative embodiments according to the invention.

Several series of glasses were produced from the compositions given in the following tables. All these glasses were produced under more or less the same oxidation-reduction conditions—their redox is between 0.12 and 0.29.

This table also gives the values of the following properties, measured for thicknesses of 4.85 mm or 3.85 mm, or 3.15 mm or 2.85 mm:

- the overall light transmission factor under illuminant A ($T_{LA}$) between 380 and 780 nm,
- the overall energy transmission factor $T_E$ integrated between 295 and 2500 nm according to the Parry Moon (Mass 2) standard,
- the ultraviolet transmission factor integrated between 295 and 380 nm, $T_{UV.ISO}$, according to the ISO 9050 standard, and
- the dominant wavelength under illuminant $D_{65}$ ($\lambda_d$).

The tables also show the temperatures $T_{log\eta=2}$ and $T_{log\eta=3.5}$ corresponding to the viscosities, expressed in poise, such that $\log\eta=2$ and $\log\eta=3.5$, as well as the liquidus temperature $T_{liq}$.

The first glass, called R, is a reference glass whose composition is standard for windows intended for the motor-vehicle industry.

TABLE 1

|  | R | 1 | 2 | 3 | 4 | 5 | 6 | 7 | 8 |
|---|---|---|---|---|---|---|---|---|---|
| $SiO_2$ | 71.6 | 72.62 | 72.63 | 72.63 | 72.86 | 72.75 | 72.57 | 72.5 | 71.70 |
| CaO | 8.6 | 8.63 | 8.63 | 8.63 | 8.68 | 8.66 | 8.64 | 8.64 | 8.63 |
| MgO | 3.7 | 0.30 | 0.30 | 0.30 | 0.30 | 0.30 | 0.30 | 0.30 | 0.30 |
| $Al_2O_3$ | 0.6 | 0.90 | 0.90 | 0.90 | 0.90 | 0.90 | 0.90 | 0.90 | 0.90 |
| $K_2O$ | 0.2 | 0.30 | 0.34 | 0.30 | 0.30 | 0.30 | 0.30 | 0.30 | 0.30 |
| $Na_2O$ | 14.2 | 15.29 | 15.29 | 15.29 | 15.37 | 15.35 | 15.31 | 15.30 | 15.30 |
| $SO_3$ | 0.2 | 0.30 | 0.30 | 0.30 | 0.30 | 0.30 | 0.30 | 0.30 | 0.30 |
| $Fe_2O_3$ | 0.86 | 1.21 | 1.21 | 1.23 | 1.12 | 1.14 | 1.13 | 1.2 | 1.12 |
| $WO_3$ | 0 | 0.45 | 0.40 | 0.45 | 0.10 | 0.25 | 0.5 | 1.2 | 0.45 |
| $CeO_2$ | 0 | 0 | 0 | 0 | 0 | 0 | 0 | 0 | 1.00 |
| Redox | 0.28 | 0.15 | 0.16 | 0.16 | 0.14 | 0.17 | 0.175 | 0.184 | 0.19 |
| $T_{LA}$ (%), 3.85 mm | 71 | 70.5 | 71.5 | 70.3 | 72.3 | 70.8 | 69.7 | 66.6 | 70 |
| $T_E$ (%), 3.85 | 43.5 | 43.9 | 43.5 | 44.9 | 45.5 | 43.7 | 42.4 | 38.2 | 42.3 |
| $T_{UV.ISO}$ (%), 3.85 mm | 18.5 | 11.6 | 12 | 11.3 | 14.7 | 13.3 | 12.6 | 11.4 | 8.0 |
| $\lambda_d$ ($D_{65}$) nm | 502 | 553 | 555 | 557 | 541 | 537 | 545 | 537 | 550 |
| $T_{\log\eta=2}$ (° C.) | 1436 | 1457 | 1457 | 1457 | 1457 | 1457 | 1457 | 1457 | 1457 |
| $T_{\log\eta=3.5}$ (° C.) | 1101 | 1107 | 1107 | 1107 | 1107 | 1107 | 1107 | 1107 | 1107 |
| $T_{liq}$ (° C.) | 1040 | 1002 | 1002 | 1002 | 1002 | 1002 | 1002 | 1002 | 1002 |

TABLE 2

|  | 9 | 10 | 11 | 12 | 13 | 14 |
|---|---|---|---|---|---|---|
| $SiO_2$ | 71.6 | 71.2 | 71.2 | 72.2 | 68.7 | 68.9 |
| CaO | 8.6 | 8.7 | 8.7 | 8.65 | 8.2 | 8.2 |
| MgO | 0.3 | 0.3 | 0.3 | 0.3 | 3.8 | 3.8 |
| $Al_2O_3$ | 0.9 | 0.9 | 0.9 | 0.9 | 0.6 | 0.6 |
| $Na_2O + K_2O$ | 15.5 | 15.7 | 15.7 | 15.6 | 15.13 | 14.9 |
| $Fe_2O_3$ | 0.77 | 0.82 | 1.3 | 1.3 | 0.75 | 0.75 |
| $WO_3$ | 0.95 | 1 | 0.35 | 0.3 | 0.5 | 0.6 |
| $CeO_2$ | 1 | 1 | 0.42 | 0.4 | 1.9 | 1.9 |
| Redox | 0.22 | 0.24 | 0.14 | 0.13 | 0.22 | 0.22 |
| $T_{LA}$ (%), 3.85 mm | 74.5 | 71.7 | 71.9 | 71.2 | 72.8 | 72.3 |
| $T_E$ (%), 3.85 mm | 47.8 | 43.5 | 46.5 | 45.5 | 47.8 | 46.9 |
| $T_{UV.ISO}$ (%), 3.85 mm | 10 | 9.5 | 9.1 | 8.6 | 7.4 | 6.9 |
| $\lambda_d$ ($D_{65}$) nm | 542 | 529 | 554 | 556 | 537 | 522 |

TABLE 3

|  | 15 | 16 | 17 | 18 |
|---|---|---|---|---|
| $SiO_2$ | 71 | 71 | 71 | 71 |
| CaO + MgO | 8.7 | 8.7 | 8.7 | 8.7 |
| $Al_2O_3$ | 0.9 | 0.9 | 0.9 | 0.9 |
| $Na_2O + K_2O$ | 15.6 | 15.6 | 15.6 | 15.6 |
| $Fe_2O_3$ | 1.2 | 1.2 | 1.32 | 1.3 |
| $WO_3$ | 0.45 | 0.45 | 1 | 1 |
| $CeO_2$ | 0 | 0 | 0.4 | 0.4 |
| $La_2O_3$ | 1 | 3 | 0 | 1 |
| Redox | 0.18 | 0.18 | 0.18 | 0.18 |
| Thickness in mm | 3.35 | 3.47 | 3.48 | 3.58 |
| $T_{LA}$ (%), 3.85 mm | 71 | 71 | 71 | 71 |
| $T_E$ (%), 3.85 mm | 44 | 44.3 | 45.4 | 45.6 |
| $T_{UV.ISO}$ (%), 3.85 mm | 13.4 | 12.4 | 8.2 | 7.4 |
| $\lambda_d$ ($D_{65}$) nm | 537 | 542 | 558 | 560 |

TABLE 4

|  | 19 | 20 | 21 | 22 | 23 |
|---|---|---|---|---|---|
| $SiO_2$ | 68.7 | 68.7 | 68.7 | 68.9 | 68.7 |
| CaO | 8.2 | 8.2 | 8.2 | 8.2 | 8.2 |
| MgO | 3.8 | 3.8 | 3.8 | 3.8 | 3.8 |
| $Al_2O_3$ | 0.6 | 0.6 | 0.6 | 0.6 | 0.6 |
| $Na_2O + K_2O$ | 15.13 | 15.13 | 15.13 | 14.9 | 15.13 |
| $Fe_2O_3$ | 0.63 | 0.73 | 0.72 | 0.73 | 0.73 |
| $WO_3$ | 0.5 | 0.5 | 0.5 | 0.6 | 0.6 |
| $CeO_2$ | 1.9 | 1.9 | 1.9 | 1.9 | 1.9 |
| Redox | 0.18 | 0.22 | 0.24 | 0.22 | 0.27 |
| $T_{LA}$ (%), 3.85 mm | 75.9 | 72.8 | 70.6 | 72.3 | 70 |
| $T_E$ (%), 3.85 mm | 53.5 | 47.8 | 44.2 | 46.9 | 42.6 |
| $T_{UV.ISO}$ (%), 3.85 mm | 8 | 7.4 | 7 | 6.9 | 7 |
| $\lambda_d$ ($D_{65}$) nm | 547 | 537 | 522 | 536 | 517 |

TABLE 5

|  | 24 | 25 | 26 | 27 | 28 |
|---|---|---|---|---|---|
| $SiO_2$ | 72.9 | 68.9 | 68.9 | 72 | 72 |
| CaO | 8.6 | 8.2 | 8.2 | 8.6 | 8.6 |
| MgO | 0 | 3.8 | 3.8 | 0 | 0 |
| $Al_2O_3$ | 0.75 | 0.6 | 0.6 | 0.75 | 0.75 |
| $Na_2O + K_2O$ | 15.36 | 14.9 | 14.9 | 15.5 | 15.5 |
| $Fe_2O_3$ | 1.3 | 0.73 | 0.73 | 0.83 | 0.83 |
| $WO_3$ | 0.4 | 0.6 | 0.6 | 0.4 | 0.4 |
| $CeO_2$ | 0.42 | 1.9 | 1.9 | 1.55 | 1.55 |
| Redox | 0.14 | 0.22 | 0.165 | 0.17 | 0.135 |
| $T_{LA}$ (%), 4.85 mm | 66.8 | * | 71.2 | 68.4 | 73.4 |
| $T_E$ (%), 4.85 mm | 39.0 | * | 46.4 | 38.5 | 47.1 |
| $T_{UV.ISO}$ (%), 4.85 mm | 5.9 | * | 4.8 | 6.5 | 6.3 |
| $T_{LA}$ (%), 3.85 mm | 71.8 | 72.3 | 75 | 72.5 | 76.8 |
| $T_E$ (%), 3.85 mm | 45.1 | 46.9 | 52.5 | 44.3 | 52.9 |

TABLE 5-continued

|  | 24 | 25 | 26 | 27 | 28 |
|---|---|---|---|---|---|
| $T_{UV.ISO}$ (%), 3.85 mm | 8.6 | 6.9 | 7 | 9.1 | 8.8 |
| $\lambda_d$ ($D_{65}$) nm | 554 | 522 | 553 | 518 | 553 |
| $T_{LA}$ (%), 3.15 mm | 74.6 | 75.4 | 77.8 | 75.7 | 79.3 |
| $T_E$ (%), 3.15 mm | 50.4 | 52.1 | 57.6 | 49.2 | 57.7 |
| $T_{UV.ISO}$ (%), 3.15 mm | 11.5 | 9.3 | 9.4 | 11.7 | 11.3 |
| $T_{LA}$ (%), 2.85 mm | 76.1 | 76.8 | 79.1 | 77.1 | 80.4 |
| $T_E$ (%), 2.85 mm | 52.9 | 54.6 | 59.9 | 51.7 | 60.0 |
| $T_{UV.ISO}$ (%), 2.85 mm | 13.1 | 10.7 | 10.8 | 13.2 | 12.7 |

In Table 6, the transmission values are calculated based on a model.

TABLE 6

|  | 29 | 30 |
|---|---|---|
| $SiO_2$ | 73.30 | 73.75 |
| CaO | 7.70 | 7.70 |
| MgO | 0 | 0 |
| $Al_2O_3$ | 1.00 | 1.00 |
| $Na_2O + K_2O$ | 15.10 | 15.10 |
| $Fe_2O_3$ | 0.70 | 1.05 |
| $WO_3$ | 0.40 | 0.40 |
| $CeO_2$ | 1.80 | 1.00 |
| Redox | 0.2 | 0.15 |
| $T_{LA}$ (%), 3.85 mm | 75.7 | 73.3 |
| $T_E$ (%), 3.85 mm | 49.8 | 47.8 |
| $T_{UV.ISO}$ (%), 3.85 mm | 8.5 | 8.5 |

TABLE 7

|  | 31 | 32 | 33 | 34 |
|---|---|---|---|---|
| $SiO_2$ | 72 | 72 | 72.2 | 72.2 |
| CaO | 8.6 | 8.6 | 8.6 | 8.6 |
| MgO | 0 | 0 | 0 | 0 |
| $Al_2O_3$ | 0.75 | 0.75 | 0.9 | 0.9 |
| $Na_2O + K_2O$ | 15.5 | 15.5 | 15.55 | 15.55 |
| $Fe_2O_3$ | 0.83 | 0.83 | 1.1 | 1.1 |
| $WO_3$ | 0.40 | 0.20 | 0.25 | 0.2 |
| $TiO_2$ | 0 | 0.2 | 0.25 | 0.3 |
| $CeO_2$ | 1.55 | 1.55 | 0.8 | 0.8 |
| Redox | 0.135 | * | * | * |
| $T_{LA}$ (%), 3.85 mm | 73.4 | 73.4 | 70.4 | 71.2 |
| $T_E$ (%), 3.85 mm | 47.1 | 47.1 | 43.8 | 44.6 |
| $T_{UV.ISO}$ (%), 3.85 mm | 6.3 | 6.6 | 6.2 | 6.0 |

*: Values not measured

First of all, these results demonstrate that these glass compositions may be melted using conventional techniques and are compatible with the usual techniques for manufacturing flat glass.

Moreover, the optical properties are satisfactory and, more particularly, the UV transmission $T_{UV.ISO}$ is less than 15% or even less than 13%, which means that the fabrics with which the passenger compartment are finished and the skin of passengers are protected.

What is claimed is:

1. Glass composition of the silica-soda-lime type, having a UV transmission such that $T_{UV.ISO}$<15%, for a glass thickness of between 2.85 mm and 4.85 mm, and containing the oxides below, within the following weight limits:

$Fe_2O_3$ 0.4–1.5%
$WO_3$ 0.1–1.2%.

2. Glass composition according to claim 1, wherein the composition has a UV transmission such that $T_{UV.ISO}$<10% for a glass thickness of between 2.85 mm and 4.85 mm.

3. Glass composition according to claim 1, wherein the composition has an overall energy transmission $T_E$ of less than 50%, for a thickness of 3.85 mm.

4. Glass composition according to claim 3, wherein the composition has an overall energy transmission $T_E$ of less than 45%, for a thickness of 3.85 mm.

5. Glass composition according to claim 1, wherein the composition has a $FeO/Fe_2O_3$ ratio of between 0.12 and 0.29.

6. Glass composition according to claim 1, wherein the composition has an overall light transmission factor under illuminant A ($T_{LA}$) of greater than or equal to 70%.

7. Glass composition according to claim 1, wherein the composition has an overall light transmission factor under illuminant A ($T_{LA}$) of less than or equal to 35%.

8. Glass composition according to claim 1, wherein the composition has an overall light transmission factor under illuminant A ($T_{LA}$) of less than or equal to 10%.

9. Glass composition according to claim 1, wherein the composition comprises the constituents below, within the following weight limits:

| $SiO_2$ | 68.5–74% |
|---|---|
| CaO | 7–10% |
| MgO | 0–5% |
| $Al_2O_3$ | 0–1.5% |
| $K_2O$ | 0–1% |
| $Na_2O$ | 13–16%. |

10. Glass composition according to claim 1, wherein the composition has an MgO content of less than or equal to 2%.

11. Glass composition according to claim 1, wherein the composition contains the oxide $CeO_2$ with a weight content of less than or equal to 2.2%.

12. Glass composition according to claim 10, wherein the composition contains the oxide $CeO_2$, within the following weight limits:

$$0.2 \leq CeO_2 \leq 1.5\%.$$

13. Glass composition according to claim 1, wherein the composition contains the oxide $TiO_2$ with a weight content of less than or equal to 1%.

14. Glass composition according to claim 12, wherein the $TiO_2$ oxide content is greater than 0.2%.

15. Glass composition according to claim 1, wherein the composition contains the oxide $La_2O_3$ with a weight content of less than or equal to 2%.

16. Glass composition according to claim 1, wherein the composition further contains at least one coloring agent selected from the group consisting of CoO, Se, $Cr_2O_3$, NiO, and $V_2O_5$.

17. Glass composition according to claim 1, wherein the composition has a temperature difference between the temperature corresponding to a viscosity $\eta$, expressed in poise, such that log $\eta$=3.5, and the liquidus temperature $T_{liq}$ of greater than 20° C.

18. Glass composition according to claim 17, wherein the temperature difference is greater than 50° C.

19. Glass composition according to claim 1, wherein the composition has a temperature corresponding to a viscosity $\eta$, expressed in poise, such that log $\eta=2$, of less than 1500° C.

20. Glass composition according to claim 1, wherein the composition has a UV transmission such that $T_{UV,ISO} \leq 13\%$ for a glass thickness of between 2.85 mm and 4.85 mm.

* * * * *

UNITED STATES PATENT AND TRADEMARK OFFICE
CERTIFICATE OF CORRECTION

PATENT NO. : 6,133,179

DATED : October 17, 2000

INVENTOR : Berthereau

It is certified that error appears in the above-identified patent and that said Letters Patent is hereby corrected as shown below:

Column 8, claim 12, line 1, change "10" to --11--.

Column 8, claim 14, line 1, change "12" to --13--.

Signed and Sealed this

Eighth Day of May, 2001

*Attest:*

NICHOLAS P. GODICI

*Attesting Officer*   *Acting Director of the United States Patent and Trademark Office*